(12) United States Patent
Ueda et al.

(10) Patent No.: US 6,580,481 B2
(45) Date of Patent: *Jun. 17, 2003

(54) INFORMATION RECORDING/DISPLAYING CARD

(75) Inventors: Hideaki Ueda, Kishiwada (JP); Tsuyoshi Nozaki, Tsuchiura (JP); Shoji Kotani, Otsu (JP)

(73) Assignee: Minolta Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/346,868

(22) Filed: Jul. 2, 1999

(65) Prior Publication Data

US 2002/0075418 A1 Jun. 20, 2002

(30) Foreign Application Priority Data

Jul. 13, 1998 (JP) ............................................ 20-197156
May 26, 1999 (JP) ............................................ 11-146992

(51) Int. Cl.$^7$ ............................................ G02F 1/1335
(52) U.S. Cl. .................................................... 349/115
(58) Field of Search ........................ 349/115; 235/487, 235/492, 493, 494; 347/174, 179, 186, 224

(56) References Cited

U.S. PATENT DOCUMENTS

| | | | | |
|---|---|---|---|---|
| 3,842,275 A | * | 10/1974 | Haas et al. .................. 250/331 |
| RE28,515 E | * | 8/1975 | Altman ............................ 349/2 |
| 3,978,320 A | * | 8/1976 | McBride, Jr. ......... 235/61.12 M |
| 3,996,260 A | * | 12/1976 | Oh et al. ................. 260/465 E |
| 4,213,038 A | * | 7/1980 | Silverman et al. .......... 235/382 |
| 4,236,332 A | * | 12/1980 | Domo .......................... 40/2.2 |
| 4,835,376 A | * | 5/1989 | Drexler ....................... 235/488 |
| 5,055,662 A | * | 10/1991 | Hasegawa .................... 235/492 |
| 5,138,604 A | * | 8/1992 | Umeda et al. ............... 369/103 |
| 5,358,582 A | * | 10/1994 | Koshizuka et al. .......... 156/235 |
| 5,421,619 A | * | 6/1995 | Dyball .......................... 283/86 |
| 6,013,345 A | * | 1/2000 | Koshida et al. ............... 428/78 |
| 6,197,460 B1 | * | 3/2001 | Tamaoki et al. ................ 349/2 |

OTHER PUBLICATIONS

G.W. Gray et al.; The Crystalline State and the Mesophases of Cholesteryl Oley Carbonate; Mol. Cryst. Liq. Cryst.; 1979, vol. 53 pp 263–270.*

Yih–Yih Lin et al.; Thermophysical Properties of Cholesteryl Oley Carbonate Determined with Microscopic FTIR/DSC System; Journal of Chinese Chemical Society; 1995, 42; pp 865–868.*

* cited by examiner

*Primary Examiner*—Toan Ton
(74) *Attorney, Agent, or Firm*—Sidley Austin Brown & Wood LLP

(57) ABSTRACT

The invention provides an information recording/displaying card and an information recording/displaying system using the card in which invisible information can be recorded, the invisible information can be displayed as visible information and visible information can be written/erased as color images at a practical speed. The information recording/displaying card includes a visible information display part and an invisible information recording part. These parts are disposed, for example, on the front and back surfaces of the card, respectively, or arranged side by side on the front or back surface thereof. The visible information display part includes, as a main component, a low molecular weight cholesteric liquid crystal compound having an isotropic phase transition temperature higher than a melting point, so that information can be displayed, written once and erased therein. The invisible information recording part is, for example, a magnetic recording layer, a write-once optical recording layer or an integrated circuit memory, in which information can be recorded and erased.

20 Claims, 7 Drawing Sheets

1A

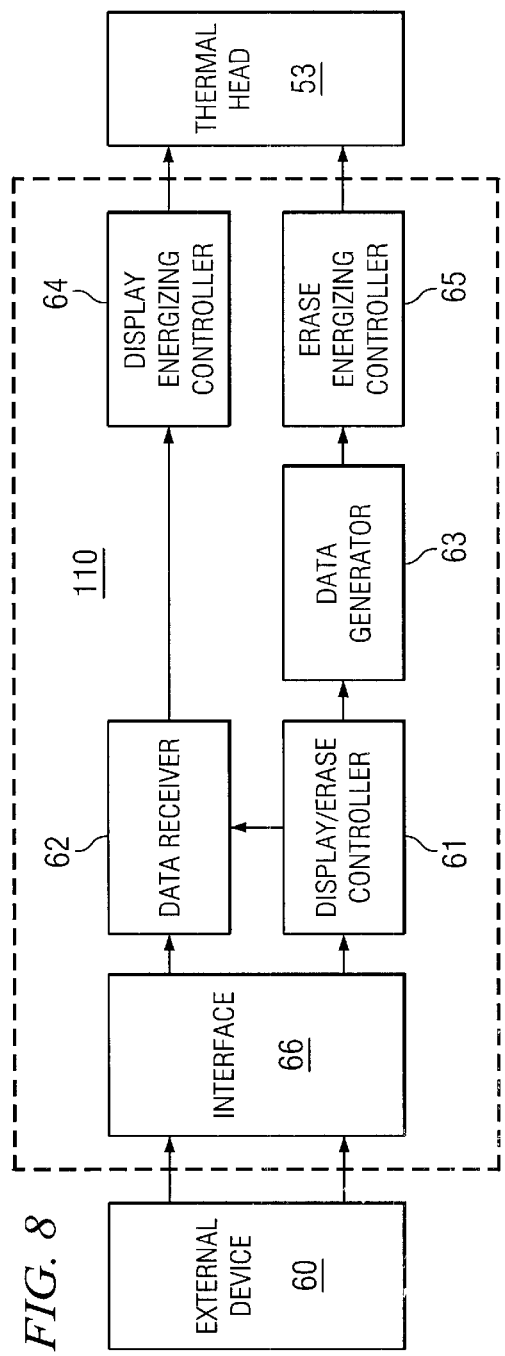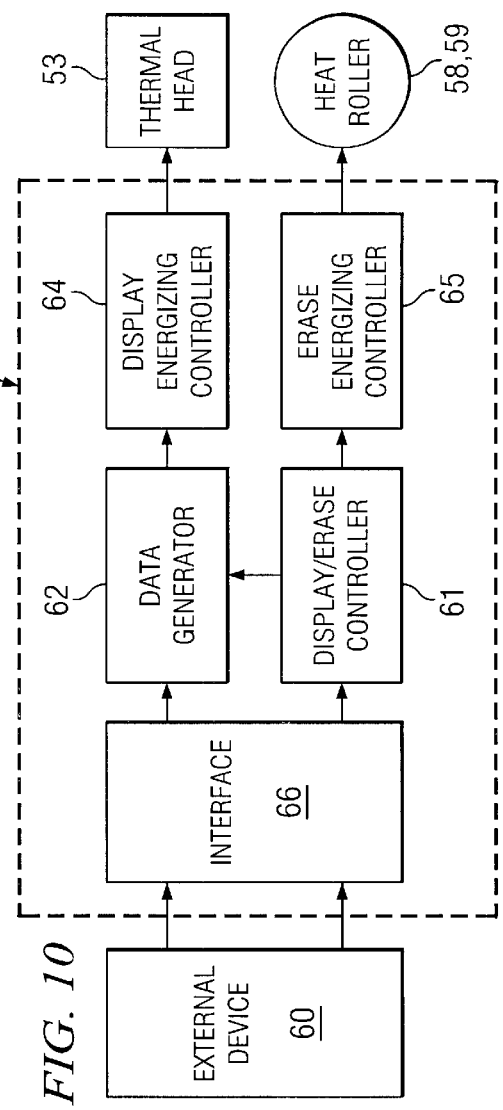

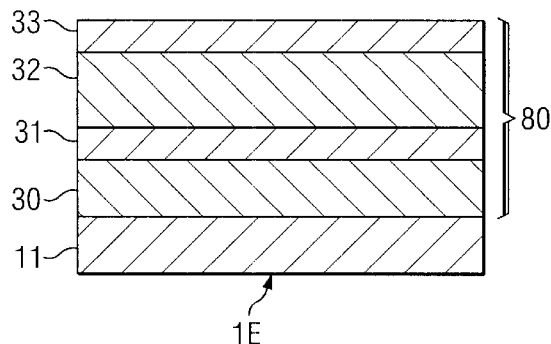
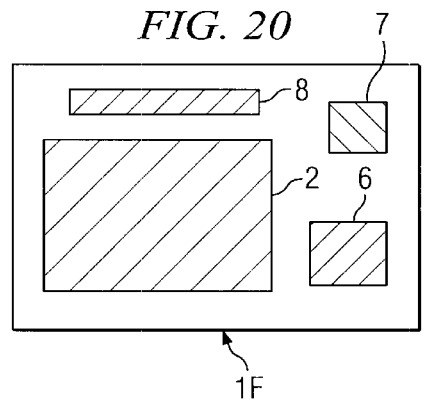
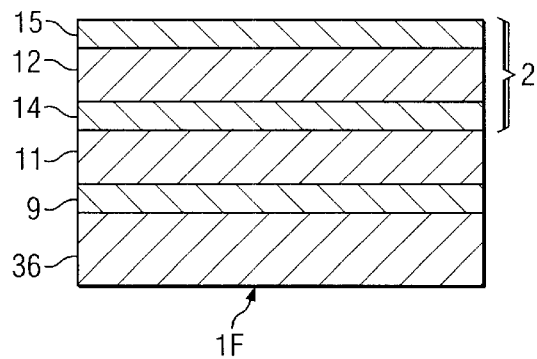
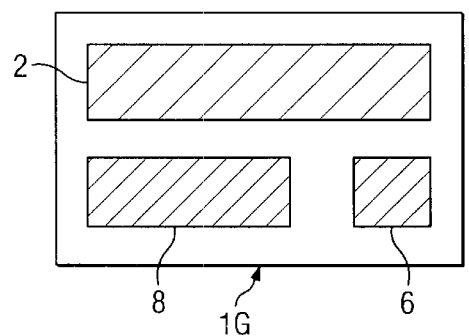
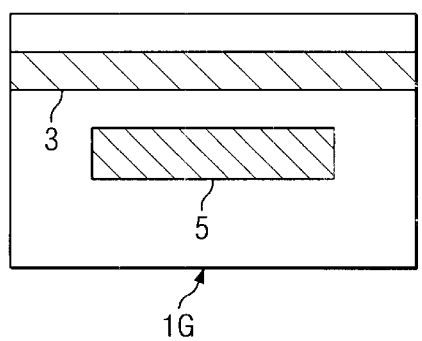

INFORMATION RECORDING/DISPLAYING CARD

This application is based on applications No.HEI11-146992 and HEI10-197156 filed in Japan, the content of which is hereby incorporated by reference.

BACKGROUND OF THE INVENTION

1. Field of the Invention

The present invention relates to an information recording/displaying card. More particularly, it relates to an information recording/displaying card comprising an invisible information recording part and a visible information display part in which information can be written in under predetermined heating conditions and written information can be erased, and an information recording/displaying system using the card.

2. Description of the Related Art

In accordance with a recent increase of interest in saving and recycling resources, recording media such as paper are desired to be repeatedly used. In attempts to develop techniques for this purpose, rewritable thermosensible recording materials in which data can be recorded and erased by using heating means such as a thermal head are regarded as promising. Such reversible thermosensible recording materials have various applications and can be used for the purpose of not only recycling recording media but also visualizing information recorded in an IC card, a magnetic card, or an optical card. card.

As conventional reversible thermosensible materials, a leuco dye/developer-subtracter, an organic low molecular weight/high molecular weight resin matrix and a polymer cholesteric liquid crystal are known.

The color of a leuco dye/developer-subtracter is exhibited by opening a lactone ring included in the molecules of the leuco dye and erased by closing the ring. The lactone ring can be opened when the temperature is increased and then rapidly decreased, and can be closed when the increased temperature is gradually decreased. The leuco dye/developer-subtracter is coated on a sheet material, so that data can be written by using a thermal head and can be erased by allowing the sheet to pass through heat rollers.

A known organic low molecular weight/high molecular weight resin matrix includes BA (behenic acid) as an organic low molecular weight compound and PVCA (copolymer of vinyl chloride and vinyl acetate) as a high molecular weight compound. This material can be switched between a transparent state and a scattering state in accordance with a heating temperature, and the switched state can be retained after cooling. This material is coated on a sheet material, so that data can be written in by using a thermal head.

As a polymer cholesteric liquid crystal, one obtained by polymerizing a vinyl compound including a cholesteric liquid crystal compound in a side chain is known. When this material is heated to a temperature exceeding the crystallization temperature and then rapidly cooled, a display color can be changed and fixed.

OBJECTS AND SUMMARY

In using the leuco dye/developer-subtracter, the display color depends upon the leuco dye, and hence, full color display of an arbitrary image cannot be obtained. In using the organic low molecular weight/high molecular weight resin matrix, an image is displayed by using the transparent and scattering states, and hence, full color display cannot be obtained. In using the polymer cholesteric liquid crystal, the display color can be changed in accordance with a heating temperature on principle. However, the change of colors takes a time on the order of minutes, which is a large obstacle to putting this material into practical use.

In view of the aforementioned disadvantages, an object of the present invention is providing an information recording/displaying card and an information recording/displaying system using the card in which invisible information can be recorded and displayed as visible information and visible information can be written and erased as color images in a practical amount of time.

In order to achieve the object, the information recording/displaying card of the present invention comprises a visible information display part and an invisible information recording part. These parts are disposed on the front and back surfaces of the card, respectively or arranged side by side on the front or back surface of the card. The visible information display part includes, as a main component, a low molecular weight cholesteric liquid crystal compound having an isotropic phase transition temperature higher than a melting point, and information can be displayed, written once and erased therein. The invisible information recording part is, for example, a magnetic recording layer, a write-once optical recording layer or an IC (integrated circuit) memory, in which information can be recorded and erased.

The information recording/displaying system of this invention comprises information erasing means for erasing information recorded in the visible information display part of the information recording/displaying card, and recording means for recording information in the invisible information recording part.

BRIEF DESCRIPTION OF THE DRAWINGS

These and other objects and features of the present invention will become apparent from the following description of preferred embodiments thereof taken in conjunction with the accompanying drawings, in which:

FIG. 8 is a schematic diagram of a control system for the thermal printer;

FIG. 9 is a schematic diagram for illustrating a heated area in write and erase operations using the thermal head;

FIG. 10 is a schematic diagram of a control system for another thermal printer;

FIG. 19 is a sectional view of a stacked layer recording part 80 of the information recording/displaying card of Embodiment 5;

FIG. 20 is a top view of an information recording/displaying card according to Embodiment 6 of the invention;

FIG. 21 is a sectional view of the information recording/displaying card of Embodiment 6;

FIGS. 22(A) and 22(B) are diagrams for respectively showing front and back surfaces of an information recording/displaying card according to Embodiment 7 of the invention;

In the following description, like parts are designated by like reference numbers throughout the several drawings.

DETAILED DESCRIPTION OF THE PREFERRED EMBODIMENTS

Figure 1A:
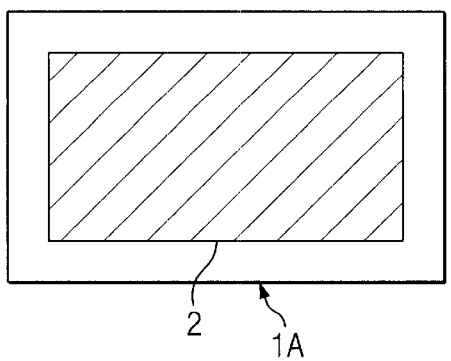
FIGS. 1(A) and 1(B) are diagrams for respectively showing front and back surfaces of an information recording/displaying card according to Embodiment 1 of the invention.

The information recording/displaying card and the information recording/displaying system using the card according to the invention will now be described with reference to the accompanying drawings. In each of the following embodiments, the description is made by specifying the names of materials to be used, which are merely examples. The invention is not limited to these materials, and various other materials can be used instead.

The information recording/displaying card of the invention comprises a visible information display part and an invisible information recording part. These parts are disposed, for example, on the front and back surfaces of the card, respectively or arranged side by side on the front or back surface thereof. The visible information display part includes, as a main component, a low molecular weight cholesteric liquid crystal compound having an isotropic phase transition temperature higher than a melting point, and information can be displayed, written once and erased therein. The invisible information recording part is, for example, a magnetic recording layer, a write-once optical recording layer or an IC (integrated circuit) memory, in which information can be recorded and erased.

Owing to the structure including the visible information display part and the invisible information recording part, information recorded in the invisible information recording part can be displayed on the card as visible information. In particular, since the low molecular weight cholesteric liquid crystal compound is used as a reversible thermosensible recording material in the visible information display part, a desired color can be rapidly displayed by applying a heating temperature in accordance with recorded information, and a full color display can be obtained. Also, the displayed information can be erased by applying heat again.

In this visible information display part, letters, numerical characters and diagrams can be written by applying heat with a thermal head, by applying an optical energy emitted by a laser beam scanner, by applying an energy of flash light irradiating through a mask, or by applying heat with a hot stamp. Furthermore, the displayed information can be erased by heating the entire surface of the card with a heat roller or the like, or by exposing the entire surface of the card to an optical energy.

In the invisible information recording part, in the application to a bank card, the amount paid, the balance of the account and the like are recorded every time the card is used. Furthermore, the amount paid and the balance are also displayed in the visible information display part, so that a user can visually obtain such information. Also, when the card is applied to a prepaid card, the amount paid and the balance are recorded in the invisible information recording part. Furthermore, the amount paid and the balance are displayed in the visible information display part, so that a user can visually obtain such information.

Owing to the aforementioned structure of the present card, visible information can be displayed in full colors without using an internal power source, a driving electrode, a polarizing plate and the like, and hence, the card can be simplified in its structure and can be manufactured at low cost. In particular, when a display sheet including a thermal recording layer of the low molecular weight cholesteric liquid crystal compound is adhered onto a finished information recording card, the information recording/displaying card can be very easily obtained.

As the low molecular weight cholesteric liquid crystal compound having the isotropic phase transition temperature higher than the melting point, compounds having a melting point (a transition temperature from liquid crystal to the cholesteric phase) of 30° C. or more and the isotropic phase transition temperature of 200° C. or less are preferred.

Typical examples of the low molecular weight cholesteric liquid crystal compounds include compounds represented by the following Chemical Formulas (A) through (G):

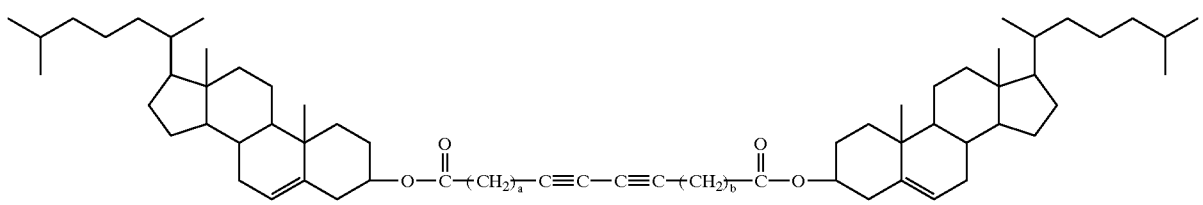
Chemical Formula (A)
wherein a and b indicate integers for attaining a+b=5 through 20.
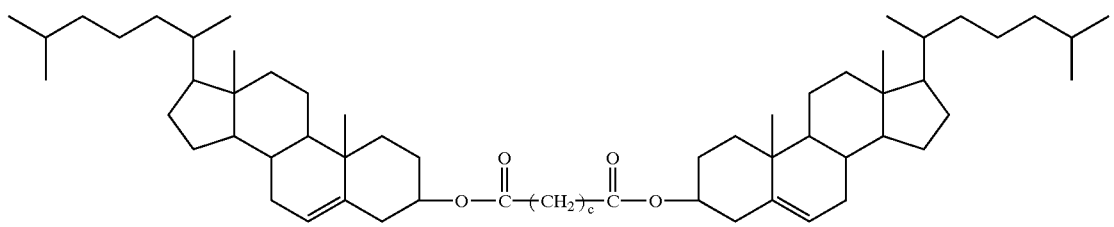
Chemical Formula (B)
wherein c indicates an integer ranging between 5 and 20.
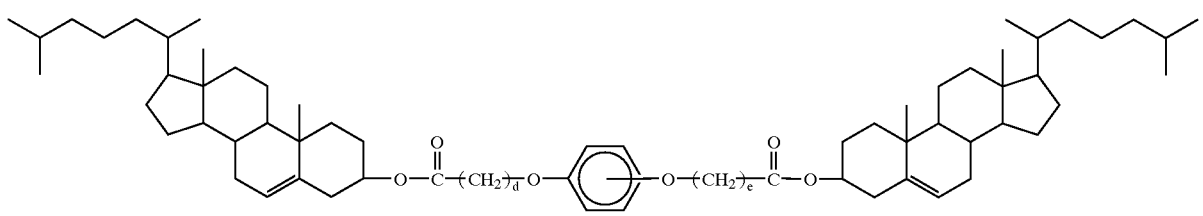
Chemical Formula (C)
wherein d and e indicate integers for attaining d+e=5 through 20.
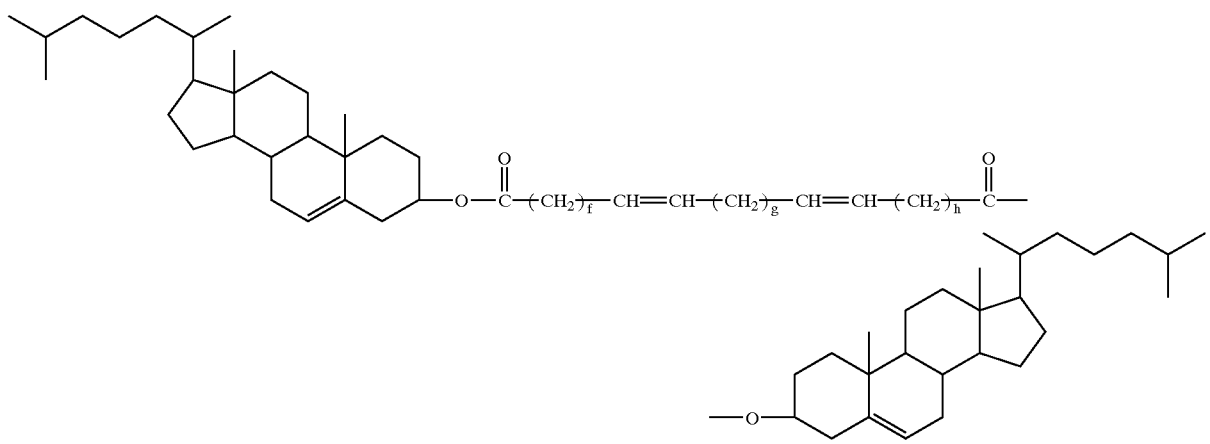
Chemical Formula (D)
wherein f, g and h indicate integers for attaining f+g+h=5 through 20.

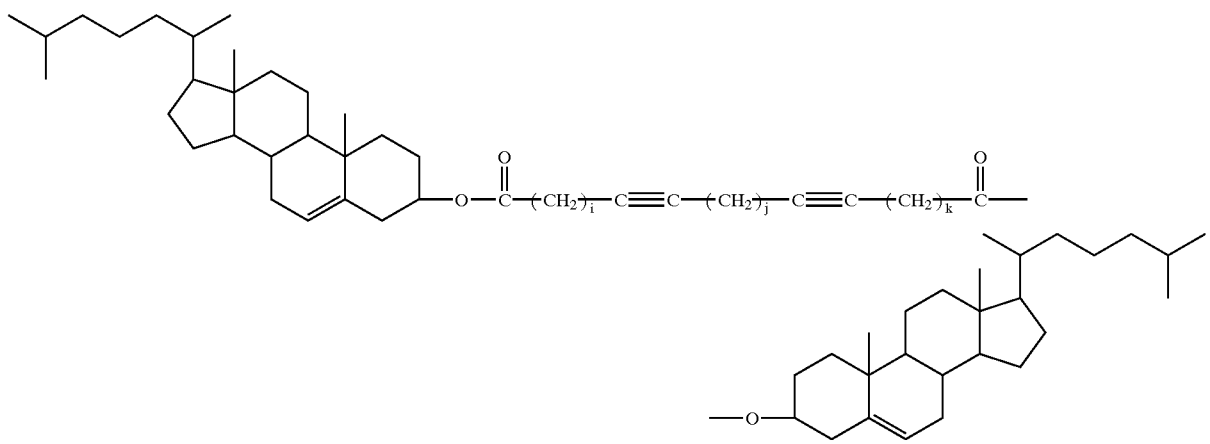

Chemical Formula (E)

wherein i, j and k indicate integers for attaining i+j+k=5 through 20, whereas j is not 0.

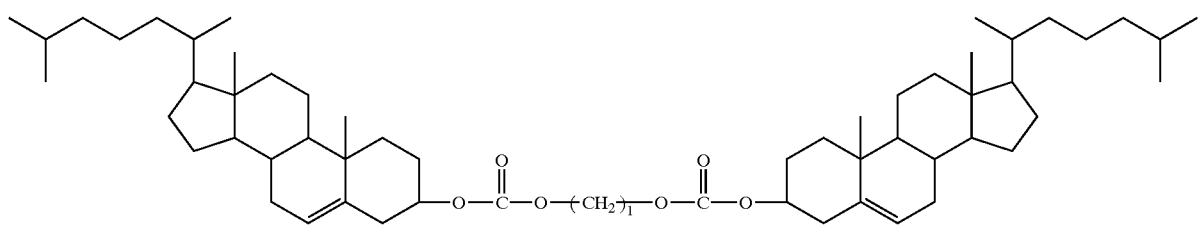

Chemical Formula (F)

wherein l indicates an integer ranging between 5 and 20.

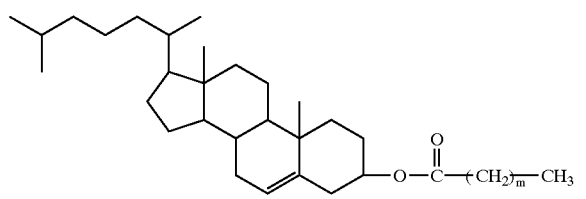

Chemical Formula (G)

wherein m indicates an integer ranging between 5 and 20.

These compounds can be singly used, or a combination thereof can be used. Alternatively, three or more of these low molecular weight cholesteric liquid crystal compounds can be combined in accordance with the properties thereof. In particular, a combination of plural low molecular weight cholesteric liquid crystal compounds can achieve various advantages of rapid display, a variety of display colors, less color shade, a wide range of temperature for changing colors, and easiness in temperature control.

It is noted that various other low molecular weight cholesteric liquid crystal compounds including a cholesterol group can be used apart from the aforementioned compounds.

At least one of the low molecular weight cholesteric liquid crystal compounds to be used preferably has a molecular weight of 1000 through 1500. When the molecular weight is smaller than 1000, the performance as a memory can be degraded. When the molecular weight exceeds 1500, the response property in writing data can be degraded and the transition temperature to the cholesteric phase can become too high.

A display layer of the visible information display part can be made from a complex film of a low molecular weight cholesteric liquid crystal compound and a polymer. When such a complex film is used, the mechanical strength of the display layer can be improved, so that the card can attain high resistance to bending and friction. The display layer can further include a spacer in a fixed shape. Thus, the thickness of the display layer can be uniform, and can be constantly retained in erasing displayed information with heat rollers. Examples of a usable spacer include spherical or plate-shaped resin fine particles or inorganic fine particles commercially available for use in a liquid crystal panel.

The visible information display part can include a protecting layer on the display layer. The protecting layer can protect a recording layer from external mechanical or chemical forces. The protecting layer can be made from a coat film of a polymer solution or lamination of a resin film. Alternatively, the protecting layer can be formed by evaporating an inorganic material or applying a solution by a sol-gel method.

In the information recording/displaying card, a part of the display layer can be used as an irreversible thermal recording area, in which specific information can be previously written. For example, when the name of a company or a decorative design is previously written, the card can be used as a specifically formatted recording medium. Also, peculiar information can be recorded and displayed therein so that the peculiar information recording part cannot be altered and rewritten.

Also, in the information recording/displaying card, a part of the display layer can be used as a recording/displaying area for writing implements, in which a signature or specific information can be personally written. Such an area can be used, for example, as a space for the name and address of a user.

Moreover, in the information recording card, in particular in the information recording/displaying card of the invention, a part of the display layer can be provided with a display part including hologram or diffraction grating, in which specific information can be previously written.

The information recording/displaying system of the invention comprises recording/erasing means for recording/erasing information in the visible information display part of the information recording/displaying card, and recording means for recording information in the invisible information recording part. The recording/erasing means can use a thermal head or a laser for writing information in the visible information display part. Also, the system can further comprise reading means for reading information recorded in the invisible information recording part. Furthermore, the system can further comprise erasing means for erasing information recorded in the invisible information recording part.
Embodiment 1 (see FIGS. 1 Through 3)

nate L) are dispersed in a mixed solvent including 40 parts by weight of methyl ethyl ketone and 40 parts by weight of toluene. The resultant solution is coated on the substrate 11 with a wire bar and dried into a thickness of approximately 10 $\mu$m. The protecting layer 25 is made from an acrylic resin layer with a thickness of 2 $\mu$m.

The display layer 12 is a liquid crystal layer including, as a main component, a low molecular weight cholesteric liquid crystal compound or a mixture thereof. Specifically, 4 parts by weight of a liquid crystal compound represented by Chemical Formula (A1) below and 1 part by weight of a liquid crystal compound represented by Chemical Formula (B1) below are mixed and dissolved in 100 parts by weight of tetrahydrofuran, and the thus obtained solution is coated on the other surface of the black substrate 11 with a blade and dried with heating. Thus, the reversible thermal display layer 12 with a thickness of 10 $\mu$m is formed. The protecting layer 15 is made from a polyester film with a thickness of 2 $\mu$m, which is stacked on and adhered onto the display layer 12 by heating at 120° C.

Chemical Formula (A1):

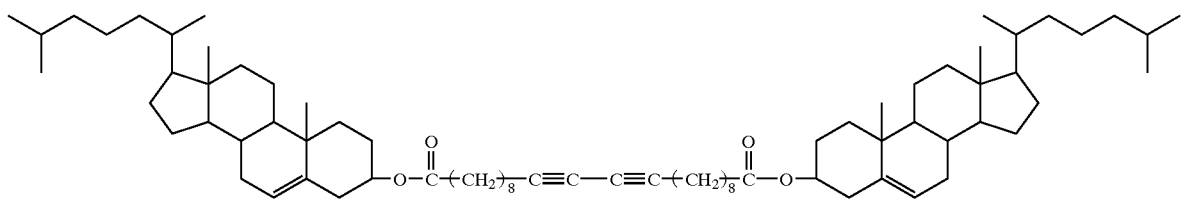

Chemical Formula (B1):

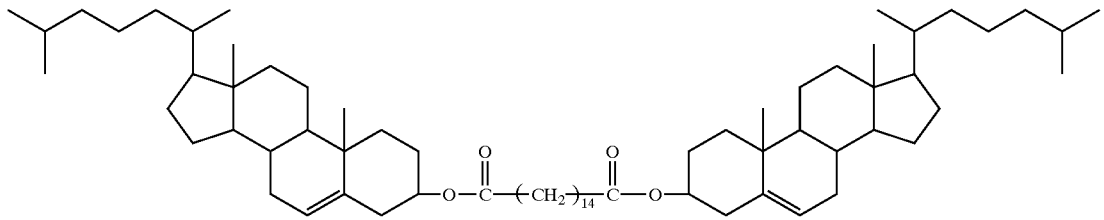

Figure 1B:
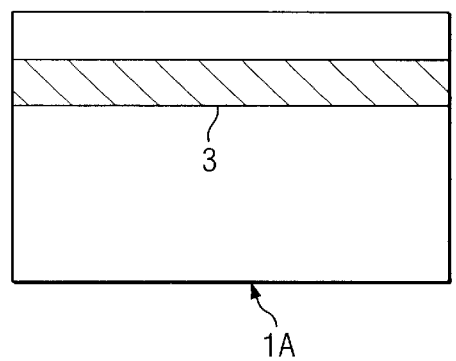
Figure 2:
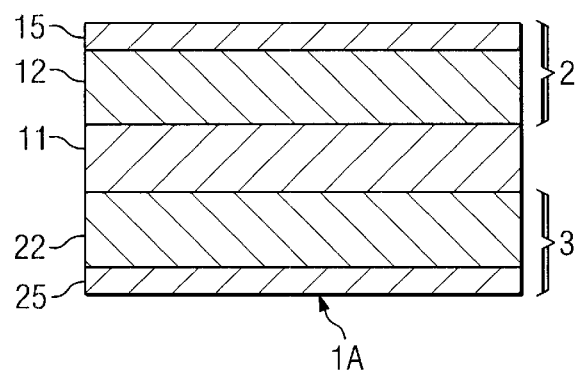
FIG. 2 is a sectional view of the information recording/displaying card of Embodiment 1.

An information recording/displaying card 1A according to Embodiment 1 of the invention comprises, as is shown in FIGS. 1(A) and 1(B), a visible information display part 2 disposed on the front surface thereof and an invisible information recording part 3 disposed on the back surface thereof. As is shown in a sectional view of FIG. 2, the display part 2 includes a reversible thermal display layer 12 formed on the surface of a substrate 11 and a protecting layer 15 covering the reversible thermal display layer 12, and the recording part 3 includes a magnetic recording layer 22 formed on the other surface of the substrate 11 and a protecting layer 25 covering the magnetic recording layer 22.

Specifically, the substrate 11 is made from a black PET (polyethylene terephthalate) film. The magnetic recording layer 22 is formed as follows: Ten parts by weight of $\gamma$-$Fe_2O_3$, 10 parts by weight of a copolymer of vinyl chloride, vinyl acetate and vinyl alcohol (manufactured by UCC; VAGH) and 2 parts by weight of isocyanate (manufactured by Nippon Polyurethane Industry Co.; Coro- The compound of Chemical Formula (Al) has an isotropic phase transition temperature of approximately 115° C. and a melting point of approximately 98° C., and the compound of Chemical Formula (B1) has an isotropic phase transition temperature of approximately 148° C. and a melting point of approximately 99° C. Furthermore, the compound of Chemical Formula (B1) can be obtained by, for example, reacting cholesterol and halide dicarboxylate or a derivative of dicarboxylic acid in the presence of an appropriate catalyst.

When this reversible thermal display layer 12 is heated to a temperature exceeding the isotropic phase transition temperature and cooled to 60 through 115° C., the liquid crystal compound is put in the cholesteric phase where its helical axis is directed to a vertical direction to the black substrate 11 serving as a light absorbing layer, so as to reflect light with a specific wavelength in accordance with a temperature. Red light is reflected at approximately 65° C., green light is reflected at approximately 80° C. and blue light is reflected at approximately 100° C., and the liquid crystal is solidified with keeping its reflecting state when the temperature is rapidly lowered from this temperature.

Also, when the liquid crystal is heated to approximately 120° C. or more and then rapidly cooled, it becomes transparent. Specifically, when the display layer 12 is heated to 120° C. or more with heat rollers or the like and then rapidly cooled, the entire surface of the display layer 12 becomes transparent. At this point, the display layer 12 looks black due to the substrate 11 (black).

Figure 3:
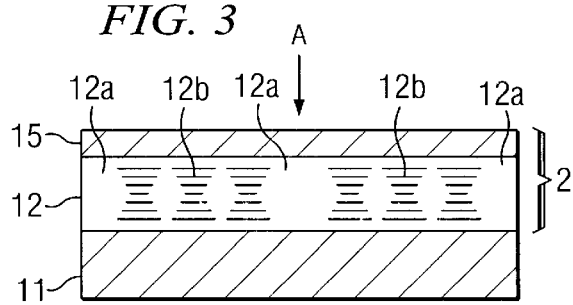
FIG. 3 is a sectional view of a visible information display part of the information recording/displaying card of Embodiment 1.
Figure 4:
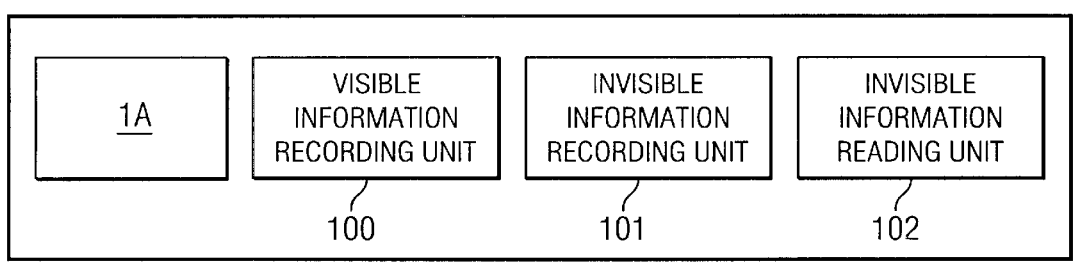
FIG. 4 is a diagram for showing the entire structure of an information recording/displaying system of the invention.

When the display layer 12 is partially heated and rapidly cooled with a conventionally known thermal head, the heated portion exhibits a reflecting color in accordance with the temperature from which the heated portion is cooled. Specifically, the portion is observed in a display color of the liquid crystal with the black for a background. In FIG. 3, a reference number 12a denotes a transparent portion and a reference number 12b denotes a portion where the cholesteric phase remains. Accordingly, when information is written by using a thermal head so as to rapidly cool the display layer from 80° C., a green image can be observed when seen from a direction shown with an arrow A. Also, when information is written so as to selectively rapidly cool the display layer from 65° C., 80° C. and 100° C., a full color display can be obtained. In a portion where the reflectance is desired to lower, a portion for displaying black is appropriately mixed, resulting in lowering the reflectance.

In Embodiment 1, the substrate 11 has a melting point of 200° C. or more, the protecting layer 15 has a crystallization temperature of 200° C., and the display layer 12 has a melting point of 119° C. Accordingly, even when the display layer 12 is heated at 120° C. or more in a write or erase operation to be liquefied, the mechanical strength can be prevented from lowering and the thickness of the display layer 12 can be retained against a pressure applied by the thermal head as far as the substrate 11, the protecting layer 15 and the recording part 3 are kept at a temperature lower than their melting points. When the display layer 12 includes a spherical spacer, the thickness can be more definitely kept.

In erasing a displayed image in the display layer 12, the display layer 12 is heated to a temperature exceeding the isotropic phase transition temperature by using heat rollers or irradiation with a light beam. When the display layer 12 is then rapidly cooled, it becomes transparent, and when it is gradually cooled, it becomes opaque. A displayed image can be erased by rapidly cooling or gradually cooling, but subsequent information can be easily written when the displayed image is erased by rapidly cooling.

Furthermore, apart from a thermal head, digital exposure using a laser beam scanner, flush exposure through a mask, a hot stamp or the like can be used for writing information.

The information recording/displaying card can be made more decorative by applying print or a seal to a portion excluding the recording part 3 and the display part 2. Thus, the card can become more convenient or attain a better appearance.

Information Recording/Displaying System (see FIGS. 4 Through 11)

(1) Entire Structure (see FIG. 4):

The present system comprises the aforementioned information recording/displaying card, a visible information recording unit 100 for recording/erasing information in the visible information display part of the information recording/displaying card, and an invisible information recording unit 101 for recording information in the invisible information recording part, and additionally includes an invisible information reading unit 102 for reading information from the invisible information recording part if necessary.

As recording means for recording information in the invisible information recording part, a dedicated card reader/writer or a commercially available card reader/writer at least capable of writing information in the invisible information recording part, preferably capable of recording and erasing information and more preferably capable of reading information is used. When the invisible information recording part is, for example, a magnetic recording layer, information is read, rewritten or erased by a reader/writer using a magnetic head. The reader/writer can be provided with a function to input information by itself or can be controlled in accordance with input data supplied by an external device such as a computer. The information recorded in the invisible information recording part is thus read, and the information is erased or another information is written in accordance with the input data externally supplied.

On the other hand, the visible information display part includes a low molecular weight cholesteric liquid crystal compound, so that information can be written and erased by heat control means such as a thermal head and a laser beam. Part of the information recorded in the visible information recording part or a portion thereof that is convenient when visualized is displayed in colors in the visible information display part, and the displayed information can be erased or re-displayed.

Figure 5:
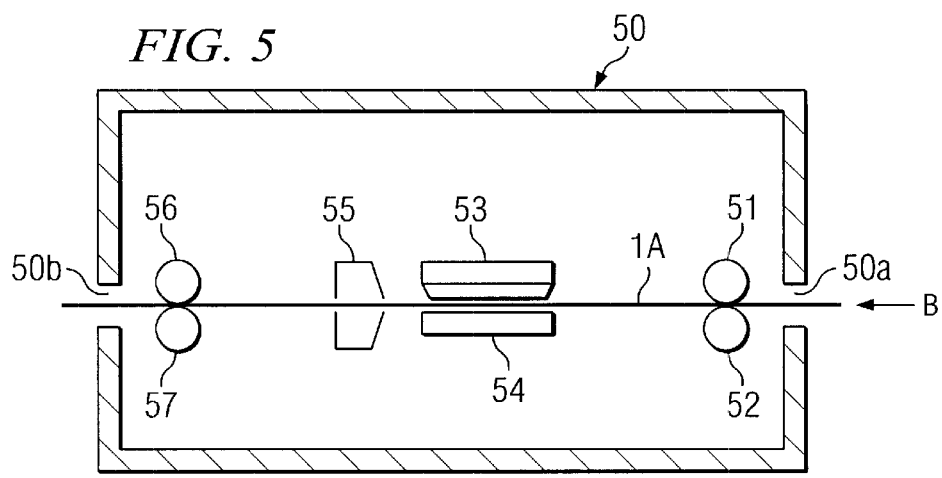
FIG. 5 is a schematic diagram for showing the structure of an exemplified thermal printer.

(2) Thermal Printer (see FIGS. 5 Through 10):

FIG. 5 is a diagram of an exemplified thermal printer usable for writing or erasing information in the display layer 12. This printer includes feeding rollers 51 and 52, a thermal head 53, a platen 54, a cooler 55, feeding rollers 56 and 57 disposed in a housing 50 in this order along a feeding direction B for feeding a recording medium.

The card 1A enters the printer through an inlet 50a, is fed by the feeding rollers 51 and 52 to be sandwiched between the platen 54 and the thermal head 53, in which information is written. After stopping heating with the thermal head 53, the card 1A is rapidly cooled, thereby solidifying the written information. The card 1A in which the information has been thus written is discharged through an outlet 50b by the feeding rollers 56 and 57.

Since the display layer 12 of the card 1A is naturally rapidly cooled after respective heating elements on the thermal head 53 have passed by, there is essentially no need to provide means for cooling the display layer 12. However, the cooler 55 can be disposed as in this embodiment or another cooler can be provided in the downstream of the thermal head 53 for ensuring the cooling.

Figure 7:
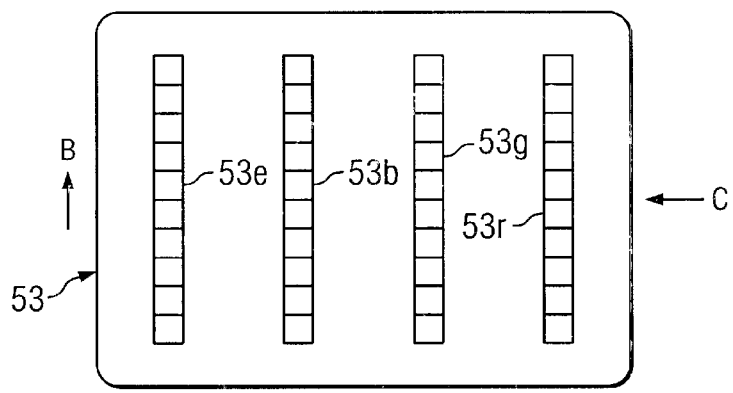
FIG. 7 is a plan view of a thermal head of the thermal printer.

The thermal head 53 includes, as is shown in FIG. 7, four heating elements disposed in parallel with one another in a direction of an arrow C perpendicular to the feeding direction B of the recording medium. A heating element 53r, a heating element 53g and a heating element 53b are used for writing information in red, green and blue, respectively. A heating element 53e is used for erasing a displayed image. Each of the heating elements includes a large number of pixel components aligned in the feeding direction B.

The thermal head 53 is capable of reciprocating in the direction C perpendicular to the feeding direction B of the recording medium in synchronization with the feed of the recording medium. While moving in the direction C, each heating element is turned on or off in accordance with image data of each color, so as to repeatedly heat and stop heating the recording medium. Thus, lines of an image in an equal number to the number of pixels are written in the display layer 12 at time, resulting in reproducing one colored image on the display part 2. The write operation using the heating elements is conducted preferably in the descending order of the temperature, namely, in the order of the heating element 53e for erasing, the heat element 53b for blue, the heating element 53g for green and the heating element 53r for red. Although the three colors can be written with one heating element, the temperature control is so complicated in this case that it is preferred that the three colors are separately written.

The written information is erased similarly by using the thermal printer. When the card 1A is heated to 120° C. or more by the heating element 53e for erasing and is rapidly cooled, the display layer 12 becomes transparent. Thus, the information is erased. Merely a part of or the entire information can be erased.

Now, a control circuit used for writing an image with the thermal head 53 will be described with reference to FIG. 8. First, image data of letters and diagrams generated by an external device 60 such as a computer and a word processor or image data read by a scanner or the like is transferred to a control unit 110 through an interface 66 together with a control command. In this case, the control command indicates, for example, a recording mode, the size of the image data and start of display.

The control command transferred from the external device 60 is successively interpreted in the control unit 110, and the image data is transferred from the control unit 110 as a voltage pulse signal of a bit image to the thermal head 53, that is, heating means. Then, each heating element is supplied with power for a given time duration for emitting heat, and the Joule heat is conducted to the display layer 12. As a result, an image is displayed in the visible information display part 2 in accordance with the image data.

When a control command is supplied to the control unit 110 in a write mode, the contents of the command are interpreted in a display/erase controller 61, and image data is received by a data receiver 62. In accordance with a signal supplied from the display/erase controller 61, the image data received by the data receiver 62 is transferred to the thermal head 53 through a display energizing controller 64 as an image recording signal. The display energizing controller 64 sets an energizing pulse width for obtaining a heat energy necessary for display, and controls the thermal head 53 serving as the heating means. The display energizing controller 64 and the data receiver 62 together constitute display control means for the thermal head 53. Thus, the thermal head 53 heats the display layer 12 of the card 1A, thereby writing information therein.

On the other hand, when a control command is supplied in an erase mode, the contents of the command are interpreted by the display/erase controller 61, and an instruction to generate an erase pattern is issued to a data generator 63 in accordance with the contents of the command. The erase pattern data generated by the data generator 63 is transferred to the thermal head 53 through an erase energizing controller 65 as an image erasing signal. Thus, an arbitrary range of the displayed image on the display layer 12 is erased. The erase energizing controller 65 sets an energizing pulse width for obtaining a heat energy necessary for erase, and controls the thermal head 53. The display/erase controller 61 and the data generator 63 together constitute erase control means for the thermal head 53.

As shown in FIGS. 9(A) and (B), in erasing a part of the displayed image, erase pattern data is generated by the data generator 63 so that a heating area in the erase operation can be larger than a heating area in the write operation, and the erase pattern data is transferred to the erase energizing controller 65, which generates an image erasing signal. The image erasing signal is transferred to the thermal head 53, and the erase operation is conducted in an area larger than the displayed image. In this manner, the display can be satisfactorily erased without fail, and a new image can be displayed in the erased area.

Figure 6:
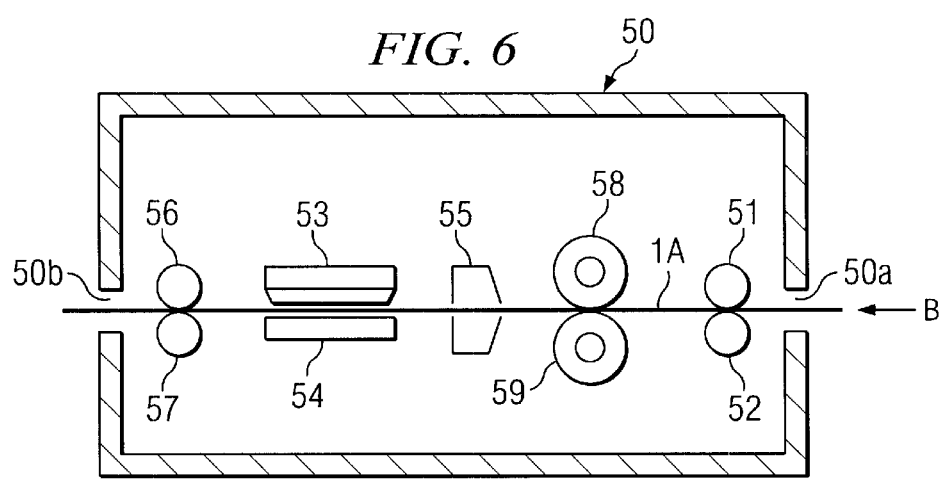
FIG. 6 is a schematic perspective view of another exemplified thermal printer.

FIG. 6 shows another exemplified thermal printer usable for writing information in the display layer 12. This thermal printer includes feeding rollers 51 and 52, heat rollers 58 and 59, a thermal head 53, a platen 54, a cooler 55 and feeding rollers 56 and 57 disposed in a housing 50 in the feeding direction B of the card.

The card 1A enters the printer through an inlet 50a, is fed by the feeding rollers 51 and 52 to the heat rollers 58 and 59, where the card 1A is heated to 120° C. or more, and is rapidly cooled by the cooler 55. At this point, the card is initialized, so that written information is erased if any. Then, the card 1A is fed to be sandwiched between the platen 54 and the thermal head 53, where information is written. After stopping heating with the thermal head 53, the card 1A is naturally rapidly cooled, so as to solidify the written information. The card 1A in which the information has been thus written is discharged through an outlet Sob by the feeding rollers S6 and S7.

A control circuit usable for writing information by using this thermal head 53 and the heat rollers 58 and 59 will be described with reference to FIG. 10. In a write mode, the control circuit is operated in the same manner as described above with regard to the thermal printer of FIG. 5. On the other hand, in an erase mode, a signal from a display/erase controller 61 is transferred to an erase energizing controller 65, which controls the heat rollers 58 and 59. As a result, a displayed image is erased by heating with the heat rollers 58 and 59.

In the thermal printer of FIG. 6, a heater included in each heat roller can be divided into plural portions in the longitudinal direction of the roller, and a data generator is further provided for generating partial erase pattern data. Thus, a displayed image can be partially erased with the heat rollers by selectively turning on/off the divided portions of the heater.

Figure 11:
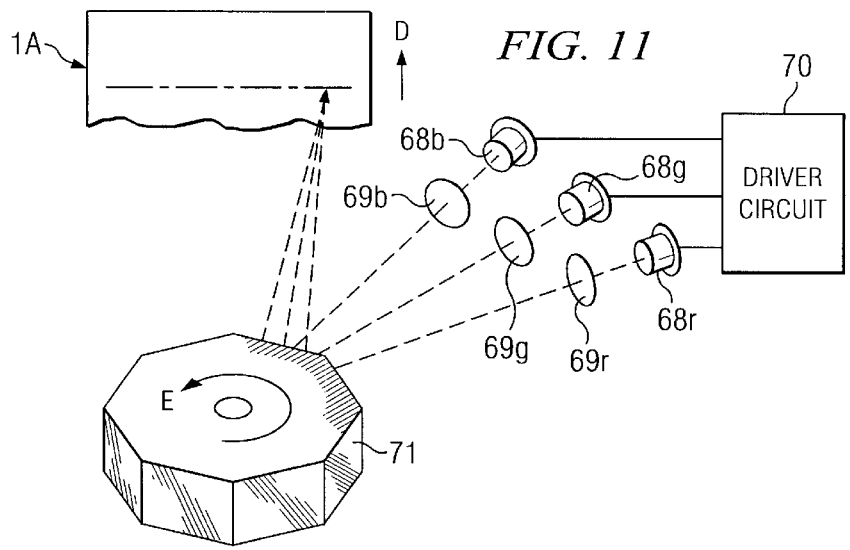
FIG. 11 is a schematic perspective view of a laser printer.

(3) Laser Printer (see FIG. 11):

Information can be written in the card 1A by using a laser printer as is shown in FIG. 11. In this case, a thermal converting layer is preferably provided for converting an energy of a laser beam into heat. The thermal converting layer can be formed by adding an absorbing agent for absorbing light with a laser wavelength or an infrared absorbing agent. Alternatively, a material with infrared absorbing property can be used as a substrate.

In this laser printer, lasers 68b, 68g and 68r, such as a semiconductor laser, a carbon dioxide laser and a YAG laser, used for respectively writing blue, green and red images are modulated by a driver circuit 70, so that laser beams emitted from the respective lasers can enter a polygon mirror 71 through collimator lenses 69b, 69g and 69r, respectively. The polygon mirror 71 is driven to rotate in a direction of an arrow E, and the laser beams are deflected in accordance with the rotation so as to linearly scan the display part 2. At the same time, the display part 2 is fed in a direction of an arrow D, and thus, two-dimensional color information is written in the display part 2. Although not shown, it goes without saying that the laser printer includes optical elements such as a fθ lens.

The color of information to be written is adjusted by controlling the energy of a laser beam. Accordingly, three colors can be written by using merely one laser with the energy thereof for each color controlled. However, the energy can be easily controlled when three lasers are used correspondingly to the respective colors.

In Embodiment 1, the visible information display part 2 and the invisible information recording part 3 are dividedly disposed on the front and back surfaces of the card 1A. However, the visible information display part 2 and the invisible information recording part 3 can be disposed on the same surface of the card 1A.

Figure 12A:
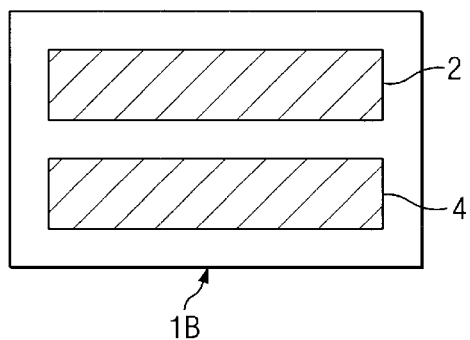
FIGS. 12(A) and 12(B) are diagrams for respectively showing front and back surfaces of an information recording/displaying card according to Embodiment 2 of the invention.
Figure 12B:
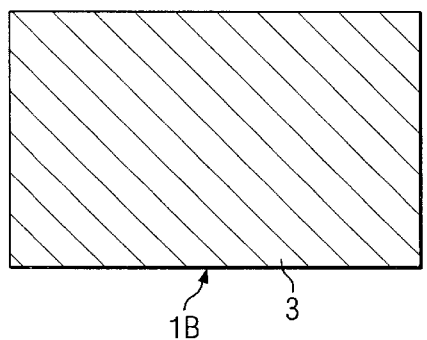
Figure 13:
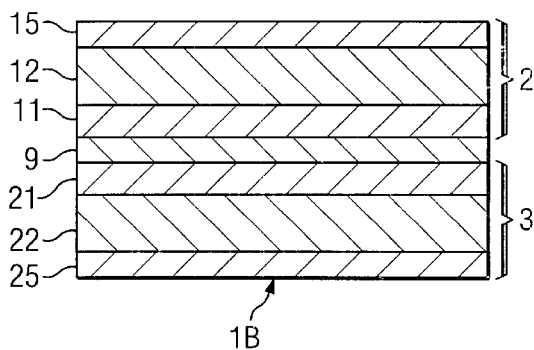
FIG. 13 is a sectional view of the information recording/displaying card of Embodiment 2.

Embodiment 2 (see FIGS. 12 and 13)

An information recording/displaying card 1B according to Embodiment 2 of the invention comprises, as is shown in FIGS. 12(A) and 12(B), a visible information display part crystal compound represented by Chemical Formula (F1) below are mixed and dissolved in 100 parts by weight of tetrahydrofuran, and the thus obtained solution is coated on the surface of the black substrate 11 with a blade, and dried by heating. Thus, the reversible thermal display layer 12 with a thickness of 10 μm is formed. The protecting layer 15 is made from a polyester film with a thickness of 2 μm, which is stacked on and adhered onto the display layer by heating at 120° C.

Chemical Formula (F1)

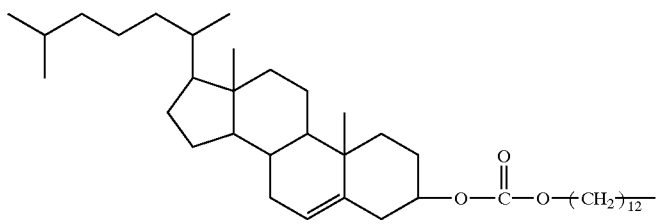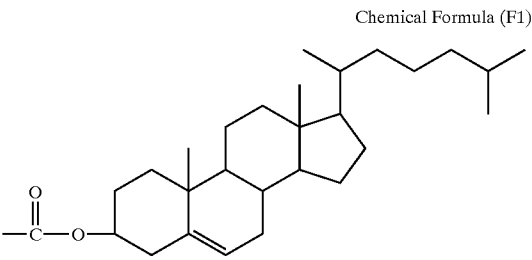

(reversible) 2 and a visible information display part (irreversible) 4 on the front surface of the card 1B, and an invisible information recording part 3 on the back surface of the card 1B. Since the irreversible visible information display part 4 is provided, a display desired to keep can be written therein, which is useful in preventing forgery and alteration. As the irreversible visible information display part 4, a general thermal layer or the like can be used.

Specifically, in Embodiment 2, a substrate 11 is made from black PET (polyethylene terephthalate). The invisible information recording part 3 is made from a magnetic recording layer, and the material and the formation method for the invisible information recording part is the same as those described in Embodiment 1.

The portion of the card where the visible information display part (reversible) 2 is formed on the front surface has a sectional structure as shown in FIG. 13. The display part 2 includes a display layer 12 formed on the surface of the substrate 11 and a protecting layer 15 covering the display layer 12. The recording part 3 includes a magnetic recording layer 22 formed on the surface of a substrate 21 and a protecting layer 25 covering the magnetic recording layer 22. The display part 2 and the recording part 3 are adhered to each other with a urethane adhesive layer 9 sandwiched therebetween.

The visible information display part (irreversible) 4 includes a thermal layer formed on the substrate 11 similarly to the display part 2. The thermal recording layer is made from a complex film formed by coating a solution obtained by finely dispersing a thermosensible dye such as a leuco dye together with a developer such as a phenol in a binder resin. The thermal recording layer is covered with a resin protecting layer. The protecting layer 15 for the visible information display part (reversible) 2 can also work as the protecting layer for the visible information display part (irreversible) 4.

Now, materials and formation methods for the respective parts will be specifically described.

The display layer 12 is a liquid crystal layer including, as a main component, a low molecular weight cholesteric liquid crystal compound or a mixture thereof. Specifically, 5 parts by weight of the liquid crystal compound represented by Chemical Formula (A1) and 5 parts by weight of a liquid The compound of Chemical Formula (F1) has an isotropic phase transition temperature of approximately 139° C. and a melting point of approximately 102° C. The compound of Chemical Formula (F1) can be obtained by, for example, reacting a cholesterolyl chloroformate compound and an alkylene glycol compound in the presence of an appropriate catalyst.

The visible information display part (irreversible) 4 is formed in the following manner: First, the irreversible thermal recording layer is formed as follows: Six parts by weight of a solution obtained by dispersing 10 parts by weight of 2-anilino-3-methyl-6-diethylaminofluoran in 20 parts by weight of a 3% hydroxycellulose aqueous solution; 20 parts by weight of a solution obtained by dispersing 25 parts by weight of bis(3-allyl-4-hydroxyphenyl)sulfon and 10 parts by weight of 1,1,3-tris(3-tert-butyl-4-hydroxy-6-methylphenyl)butane in 65 parts by weight of a 3% poly (vinyl alcohol) aqueous solution; and 30 parts by weight of a solution obtained by dissolving 10 parts by weight of zinc stearate and 40 parts by weight of calcium carbonate in 100 parts by weight of a 2.5% methylcellulose aqueous solution are mixed and stirred with 70 parts by weight of a 10% poly(vinyl alcohol) solution and 25 parts by weight of a 20% stearic acid amide emulsion. The thus obtained solution is coated with a roll coater to attain a thickness of 20 μm when dried. The resultant coat film is dried, thereby forming the irreversible thermal recording layer. Then, the protecting layer on the thermal recording layer is formed as follows: A graft copolymer emulsion is obtained by polymerizing methyl methacrylate, lower hydroxyalkyl acrylate and methacrylic acid together with a dispersing agent in a poly(vinyl alcohol) aqueous solution. The obtained graft copolymer emulsion is coated with a roller coater to attain a thickness of 5 μm when dried. The resultant coat film is dried, thereby forming the protecting layer.

The substrate 21 is made from a transparent polycarbonate sheet. The magnetic recording layer 22 is formed as follows: Ten parts by weight of γ-$Fe_2O_3$, 10 parts by weight of a copolymer of vinyl chloride, vinyl acetate and vinyl alcohol (manufactured by UCC; VAGH) and 2 parts by weight of isocyanate (manufactured by Nippon Polyurethane Industry Co.; Coronate L) are dispersed in a mixed solvent including 40 parts by weight of methyl ethyl ketone and 40 parts by weight of toluene. The resultant solution is coated on the substrate 21 with a wire bar and dried into a thickness of approximately 10 μm. The protecting layer 25 is made from an acrylic resin layer with a thickness of 2 μm.

Subsequently, a urethane adhesive is applied on the back surface of the substrate 11, so as to be adhered to the substrate 21. In this manner, the card 1B is manufactured.

In Embodiment 2, when the display layer 12 is heated and then rapidly cooled, a heated portion exhibits a reflecting color in accordance with the temperature from which the portion is rapidly cooled, resulting in forming a color image. When the temperature is rapidly lowered, the portion is solidified while keeping its reflecting state. Also, after the display layer 12 is heated to approximately 140° C. or more, when it is rapidly cooled, it becomes transparent, and when it is gradually cooled, it becomes opaque. In either case, a displayed image is erased.

Figure 14:
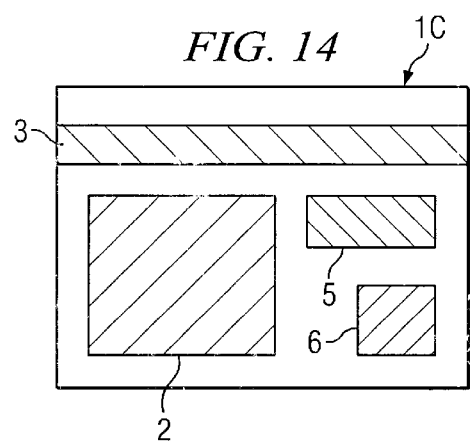
FIG. 14 is a diagram for showing an exemplary arrangement of a recording part and a display part on the front surface of the card.
Figure 15:
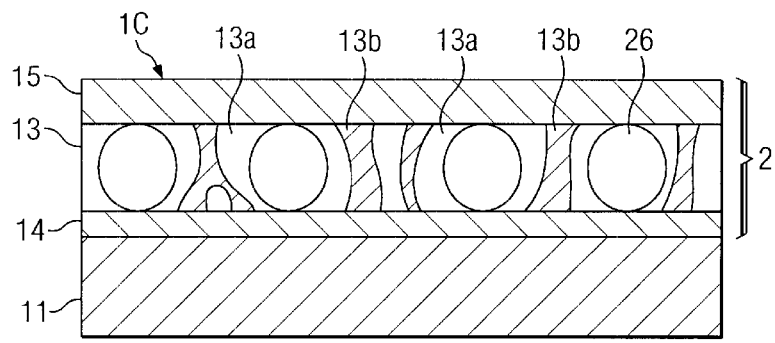
FIG. 15 is a sectional view of a display part of an information recording/displaying card according to Embodiment 3 of the invention.

Embodiment 3 (see FIGS. 14 and 15)

An information recording/displaying card 1C according to Embodiment 3 of the invention comprises, as is shown in FIG. 14, a reversible visible information display part 2, a space part 5 for writing implements, a hologram or diffraction grating display part 6, and an invisible information recording part 3 disposed on the front surface of the card 1C. The hologram or diffraction grating display part 6 is a display part capable of reproducing a two-dimensional or three-dimensional image including hologram or diffraction grating. A usable example of the hologram display part includes a relief hologram in which an intensity distribution caused by interference between object light and reference light is recorded as a surface irregular pattern. A usable example of the diffraction grating display part includes a relief diffraction grating similarly recorded as a surface irregular pattern. In both a relief hologram and a relief diffraction grating, information recorded as the surface irregularities is reproduced by providing a reflecting layer. For example, when specific design or letters are recorded in this part, the card becomes difficult to forge. Also, this part can be used for detecting or referring a specific card.

The visible information display part 2 includes, as is shown in FIG. 15, a display layer 13 formed on a substrate 11. The display layer 13 is made from a complex film of a low molecular weight cholesteric liquid crystal compound and a polymer, is divided into a liquid crystal composition 13a and a resin film 13b, and further includes a spherical spacer 26 of a resin, an inorganic oxide or the like.

In Embodiment 3, since the display layer 13 includes the polymer complex film, the display layer 13 has large mechanical strength and can be suppressed from being damaged by an external force such as bending or friction. Also, even when the display layer 13 is heated to a temperature at which the low molecular weight cholesteric liquid crystal compound becomes the isotropic phase, the display layer 13 scarcely degrades.

Specifically, the substrate 11 of the display part 2 is made from a white PES (polyether sulfone) sheet. A light absorbing layer 14 is formed by coating the substrate 11 with an isopropyl alcohol solution including carbon black dispersed in a silicon resin (manufactured by Toshiba Silicon Co.; YR3370) and a catalyst (manufactured by Toshiba Silicon Co.; CR15) into a thickness of 5 μm and by curing the thus formed coat film.

Then, the resin spacer 26 with an average particle size of 15 μm is dispersed in ethanol and the resultant is applied on the light absorbing layer 14 by spraying. Subsequently, a liquid crystal composition is prepared by mixing the cholesteric liquid crystal compound represented by Chemical Formula (A1) with bifunctional acrylate R712 having an aromatic ring (manufactured by Nippon Kayaku Co.) including 3 wt % of a photopolymerization initiator DAROCUR 1173 (manufactured by Ciba-Geigy) at a weight ratio of 8:2. This liquid crystal composition is applied on the light absorbing layer 14, and a transparent PET (polyethylene terephthalate) film with a thickness of 2 μm is adhered thereon as the protecting layer 15.

Then, while applying a pressure to the protecting layer 15, the resultant card is irradiated with UV of 0.02 mW/cm$^2$ for 1 hour and with UV of 0.25 mW/cm$^2$ for 1 hour, thereby forming the complex film (i.e., the reversible thermal display layer 13) with a thickness of 15 μm.

In Embodiment 3, when the display layer 13 is heated and rapidly cooled, a heated portion exhibits a reflecting color in accordance with the temperature from which it is cooled, and the light absorbing layer 14 absorbs visible light. Accordingly, the portion is observed in a reflecting color with black for a background. A heated portion exhibits red when cooled from approximately 68° C., green when cooled from approximately 87° C. and blue when cooled from approximately 100° C., and the reflecting state is solidified by rapidly cooling the portion from such a temperature. Also, after the display layer 13 is heated to approximately 130° C. or more, when it is rapidly cooled, it becomes transparent, and when it is gradually cooled, it becomes opaque. In either case, a displayed image is erased.

The invisible information recording part 3 includes a magnetic recording layer, and the material and the formation method are the same as those described in Embodiment 1.

The hologram or diffraction grating display part 6 is generally formed by stacking, by coating or transferring means, a hologram layer or a diffraction grating layer on a reflecting layer obtained by coating a metal, a metal compound or a glass with a reflective thin film by evaporation, spattering, ion plating, electrolytic plating or electro-less plating. As the hologram layer or the diffraction grating layer, any of various resin materials can be selected. Specifically, the usable resin material is one or a combination of two or more of an unsaturated polyester resin, an acrylurethane resin, an epoxy denatured acrylic resin, an epoxy denatured unsaturated polyester resin, an acrylate resin, an acrylamide resin, a nitrocellulose resin, a polystyrene resin, an alkyd resin, and a phenol resin; or any of these resins including, as an additive, an isocyanate resin, a metallic soap such as cobalt naphthenate and copper naphthenate, or a thermosetting or UV-curing agent such as benzoyl peroxide, methyl ethyl ketone phenon, anthraquinone, naphthoquinone, azobisisobutyronitrile, and diphenyl sulfide. The mixing ratio between the aforementioned resins and additives is adjusted so that the melting point of the mixture can be higher than the temperature for thermal transfer, and the melting point is preferably 95° C. through 200° C., and more preferably 100° C. through 200° C. The hologram layer or the diffraction grating layer can be formed by an ink applying method of a known technique, and when it is formed by transferring a foil, the thickness is preferably in a range between 0.5 μm and 2 μm. Preferable examples of the material for the reflecting layer include Al, Cr, Ni, Ag and Au, and the thickness is 10 through 10000 angstrom (Å), and preferably 200 through 2000 Å.

Figure 16A:
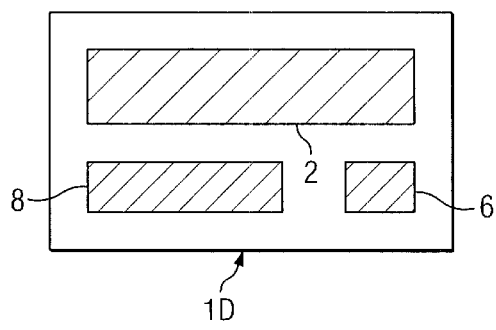
FIGS. 16(A) and 16(B) are diagrams for respectively showing front and back surfaces of an information recording/displaying card according to Embodiment 4 of the invention.
Figure 16B:
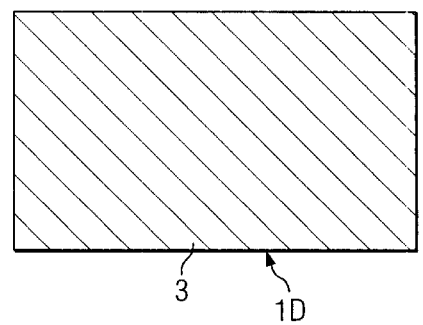
Figure 17:
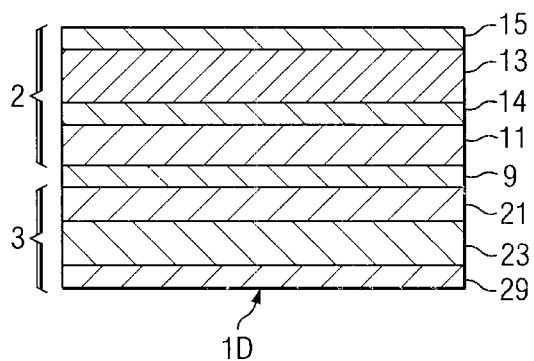
FIG. 17 is a sectional view of the information recording/displaying card of Embodiment 4.

Embodiment 4 (see FIGS. 16 and 17)

An information recording/displaying card 1D according to Embodiment 4 of the invention comprises, as is shown in FIGS. 16(A) and 16(B), a visible information display part 2, an embossed letter part 8 and a hologram display part 6 on the front surface of the card 1D and an invisible information recording part 3 on the back surface of the card 1D. In the embossed letter part 8, embossed letters are formed for visual reference, which is useful for preventing forgery and alteration of the card.

In Embodiment 4, substrates 11 and 21 are made from white PET (polyethylene terephthalate). The invisible information recording part 3 includes a write-once magneto-optical recording layer.

The portion of the card 1D where the visible information recording part 2 is formed on the front surface has a sectional structure as shown in FIG. 17. The display part 2 including a light absorbing layer 14 and a display layer 13 formed on the substrate 11 and covered with a protecting layer 15 is adhered to the recording part 3 including a write-once magneto-optical recording layer 23 formed on the substrate 21 and covered with a protecting layer 29, with a urethane adhesive layer 9 sandwiched therebetween.

In Embodiment 4, the display layer 13 is made from a polymer complex film as in Embodiment 3, and hence, the display layer 13 has large mechanical strength and can be suppressed from being damaged by an external force such as bending and friction. Also, when the display layer 13 is heated to a temperature at which a low molecular weight cholesteric liquid crystal compound becomes the isotropic phase, the display layer 13 scarcely degrades.

Now, materials and formation methods for the respective parts will be specifically described.

A white PET (polyethylene terephthalate) substrate is coated with an isopropyl alcohol solution including carbon black dispersed in a silicon resin (manufactured by Toshiba Silicon Co.; YR3370) and a catalyst (manufactured by Toshiba Silicon Co.; CR15) into a thickness of 5 μm. The thus obtained coat film is cured, thereby forming the light absorbing layer.

Then, 10 parts by weight of the cholesteric liquid crystal compound represented by Chemical Formula (A1), 10 parts by weight of a cholesteric liquid crystal compound represented by Chemical Formula (C1) below, 5 parts by weight of a polyester resin (manufactured by Toyobo Co.; Vylon 200) and 0.1 part by weight of a resin spacer with an average particle size of 10 μm are mixed and dispersed in 100 parts by weight of tetrahydrofuran. The thus obtained solution is applied on the light absorbing layer with a blade and the resultant coat film is cured, thereby forming the reversible thermal display layer 13 with a thickness of 10 μm. On the display layer 13, an acrylic resin layer with a thickness of 2 μm is applied and cured by heating, thereby forming the protecting layer 15.

The write-once optical recording layer 23 is formed by successively evaporating $Sb_2Se_3$ and $Bi_2Te_3$ on the substrate 21.

The protecting layer 29 is made from an acrylic resin layer with a thickness of 2 μm.

In Embodiment 4, when the display layer 13 is heated and rapidly cooled, a heated portion exhibits a reflecting color in accordance with the temperature from which it is cooled, and the substrate 11 absorbs visible light. Therefore, the portion is observed in a reflecting color with black for a background.

In the invisible information recording part, information is recorded and erased by using a magneto-optical head for generating a laser beam and a magnetic field based on data, and recorded information is read by using a reading head for emitting light with a predetermined wavelength and reading reflected light.

Figure 18:
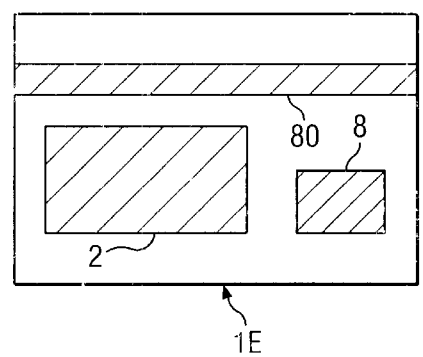
FIG. 18 is a diagram of an information recording/displaying card according to Embodiment 5 of the invention in which a recording part and a display part are arranged on the front surface thereof.

Embodiment 5 (see FIGS. 18 and 19)

An information recording/displaying card 1E according to Embodiment 5 of the invention comprises, as is shown in FIG. 18, a visible information display part 2, a stacked layer recording part 80 and an embossed letter part 8 on the front surface of the card 1E. In the stacked recording part 80, an invisible information recording part and a visible information display part are stacked. The visible information display part of the stacked layer recording part 80 is useful for preventing forgery or alteration of the card because it can irreversibly display information peculiar to the card.

Specifically, the sectional structure of the stacked recording part 80 is shown in FIG. 19. On a substrate 11, a magnetic recording layer 30, a thermal breaking display layer 31 and a hologram layer 32 are formed to be covered with a protecting layer 33. In Embodiment 5, the substrate 11 is made from a white PET (polyethylene terephthalate) card. The material and the formation method for the magnetic recording layer 30 of the stacked layer recording part 80 are the same as those described in Embodiment 3.

The visible information display part 2 is the same as that described with reference to FIG. 15 and includes a display layer 13, which is made from a complex film of a low molecular weight cholesteric liquid crystal compound and a polymer resin. The display layer 13 is divided into a liquid crystal component 13a and a resin film 13b, and further includes a spherical spacer 26 of a resin or an inorganic oxide compound.

A light absorbing layer 14, the display layer 13 and a protecting layer 15 of the visible information display part 2

Chemical Formula (C1)

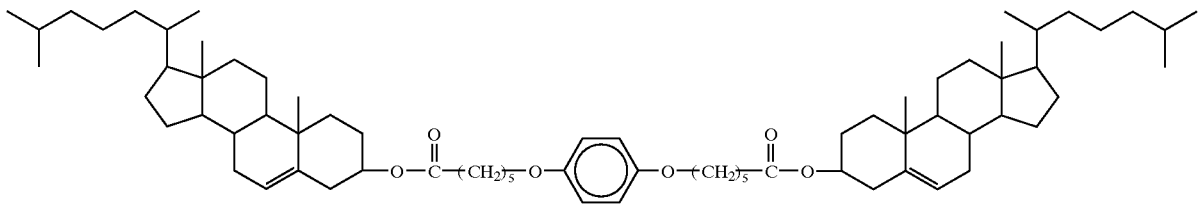

The compound of Chemical Formula (C1) has an isotropic phase transition temperature of approximately 182° C. and a melting point of 146° C. The compound of Chemical Formula (C1) can be obtained, for example, by reacting cholesterol and halide dicarboxylate or a derivative of dicarboxylic acid in the presence of an appropriate catalyst.

of Embodiment 5 are formed in the same manner as described in Embodiment 3.

The formation of the stacked layer recording part 80 will now be specifically described.

First, on a white PET (polyethylene terephthalate) sheet, the magnetic recording layer 30 is formed. The magnetic recording layer is formed by applying, on the card substrate, a disperse substance obtained by dispersing a known magnetic material such as γ-Fe$_2$O$_3$, Fe—Cr and Fe—Co in an appropriate resin or ink vehicle by a known method such as the gravure method, the roll coater method, and the knife edge method. Alternatively, a metal and an alloy such as Fe, Fe—Cr and Fe—Co can be applied on the substrate by the vacuum evaporation, spattering or plating. When the magnetic recording layer is formed by a coating method, the thickness is 1 through 100 µm, and preferably approximately 5 through 20 µm. When it is formed by vacuum evaporation, spattering or plating, the thickness is 100 Å through 1 µm, and preferably approximately 500 through 2000 Å.

Then, the thermal breaking display layer 31 is formed on the magnetic recording layer 30. Examples of a non-magnetic thin film layer usable as the thermal breaking display layer 31 includes a metal such as Cr, Ni, Te, Sn, In, Al, Cu, Bi and Pb; an alloy of any of these metals; and a compound of any of these metals such as Te-carbide. The non-magnetic thin film layer is formed on the magnetic recording layer by vacuum evaporation, spattering or plating. Since this non-magnetic thin film layer works as the thermal breaking display layer, the melting point thereof is preferably low. The thickness of the thermal breaking display layer 31 is 100 Å through 1 µm, and preferably approximately 500 through 1000 Å.

Furthermore, a coloring layer 34 can be disposed, if necessary, for example, between the thermal breaking display layer 31 and the magnetic recording layer 30 for more clearly displaying visible information. The coloring layer 34 can be formed on the thermal recording layer as follows: A pigment in accordance with a desired color, and a plasticizer, a stabilizer, wax and a leveling agent if necessary, are added to a resin binder, and the resultant is mixed and dispersed in a solvent or a diluent to give a coloring paint or ink. The coloring paint or ink is applied on the magnetic recording layer by a known method such as the gravure method, the roll coater method, and the knife edge method.

On the thermal breaking display layer 31, the hologram layer 32 is formed. Various resin materials can be selected as the material for the hologram layer 32. Specifically, the usable resin material is one or a combination of two or more of an unsaturated polyester resin, an acrylurethane resin, an epoxy denatured acrylic resin, an epoxy denatured unsaturated polyester resin, an acrylate resin, an acrylamide resin, a nitrocellulose resin, a polystyrene resin, an alkyd resin, and a phenol resin; or any of these resins including, as an additive, an isocyanate resin, a metallic soap such as cobalt naphthenate and copper naphthenate, or a thermosetting or UV-curing agent such as benzoyl peroxide, methyl ethyl ketone phenon, anthraquinone, naphthoquinone, azobisisobutyronitrile, and diphenyl sulfide. The mixing ratio between the aforementioned resins and additives is adjusted so that the glass transition temperature of the mixture can be higher than the temperature for thermal transfer, and the glass transition temperature is preferably 100° C. through 200° C. The hologram layer 32 can be formed by an ink applying method of a known technique, and when it is formed by transferring a foil, the thickness is preferably in a range between 0.5 µm and 2 µm.

In this embodiment, the thermal breaking display layer 31 also works as a hologram reflecting layer, but the hologram reflecting layer can be provided separately from the thermal breaking display layer. The hologram reflecting layer is a reflective thin film in general, and can be formed on a resin layer by applying a metal, a metal compound or glass by vacuum evaporation, spattering or plating. When a reflection hologram is adopted, a metallic thin film for reflecting light is used as a reflecting film. However, a transmission hologram can be adopted, and in this case, it is necessary to provide a material layer that can exhibit a hologram effect together with a resin layer for forming a hologram and does not mask an underlying layer.

Examples of the material for the metallic thin film layer used in a reflection hologram as in this embodiment include Cr, Ni, Te, Sn, In, Al, Cu, Bi, Pb, Ag and Au; and an alloy and a compound of these metals, among which Al, Ni, Ag and Au are preferred. The thickness is 10 Å through 1 µm, and preferably approximately 500 through 2000 Å.

The protecting layer 33 is formed by laminating a synthetic resin film or coating with a synthetic resin paint. Various resins can be used, and in particular, a thermosetting resin is advantageous in the surface hardness and prevention of contamination. Furthermore, a paint including a UV-curing resin is preferred because such a paint can be simultaneously cured after painting.

In Embodiment 5, when the display layer 13 of the visible information display part 2 is heated and rapidly cooled, a heated portion exhibits a reflecting color in accordance with the temperature from which it is cooled, and the reflecting state is solidified by rapidly cooling it from the temperature. Also, after the display layer 13 is heated to approximately 120° C. or more, when it is rapidly cooled, it becomes transparent, and when it is gradually cooled, it becomes opaque. In either case, a displayed image is erased.

Embodiment 6 (see FIGS. 20 and 21)

An information recording/displaying card 1F according to Embodiment 6 of the invention comprises, as is shown in FIG. 20, a visible information display part 2, a hologram display part 6, an embossed letter part 8 and an input terminal 7 disposed on the front surface of the card 1F. The sectional structure of the visible information display part 2 is shown in FIG. 21. The display part 2 including a light absorbing layer 14, a reversible thermal display layer 12 and a protecting layer 15 formed on a substrate ii is adhered onto a base substrate 36 with an adhesive layer 9. The base substrate 36 is a so-called IC card using an IC substrate provided with a CPU and an IC memory.

The IC card includes elements such as a CPU, a ROM, a RAM and an EEPROM (electrically erasable programmable read only memory), and is of contact type equipped with an input/output terminal for connection between these elements and an external device. It goes without saying that the IC card can be of non-contact type that transmits and receives information through electromagnetic induction, electric waves or light.

In Embodiment 6, since the IC card is used as the base substrate 36, mass information with high security can be stored. Also, the embossed letter part 8 and the hologram display part 6 provided on the front surface are useful for preventing forgery and alteration of the card. In addition, since the visible information display part 2 is rewritable and capable of color display, user data can be displayed in a colored design, and hence, the display is clear and information can be easily displayed.

The hologram display part 8 has the same structure as described in Embodiment 3. In the embossed letter part 8, embossed letters are formed.

The materials and formation method for the visible information display part 2 will now be specifically described.

A white PET (polyethylene terephthalate) sheet is coated with an isopropyl alcohol solution including carbon black dispersed in a silicon resin (manufactured by Toshiba Silicon Co.; YR3370) and a catalyst (manufactured by Toshiba Silicon Co.; CR15) into a thickness of 5 µm. The thus obtained coat film is cured, thereby forming the light absorbing layer.

Then, 10 parts by weight of the cholesteric liquid crystal compound represented by Chemical Formula (F1), 10 parts by weight of a cholesteric liquid crystal compound represented by Chemical Formula (B2) below and 0.1 part by weight of a resin spacer with an average particle size of 8 μm are mixed and dispersed in 100 parts by weight of tetrahydrofuran. The thus obtained solution is applied on the light absorbing layer with a blade and the resultant coat film is cured, thereby forming the reversible thermal display layer 12 with a thickness of 8 μm.

Figure 24:
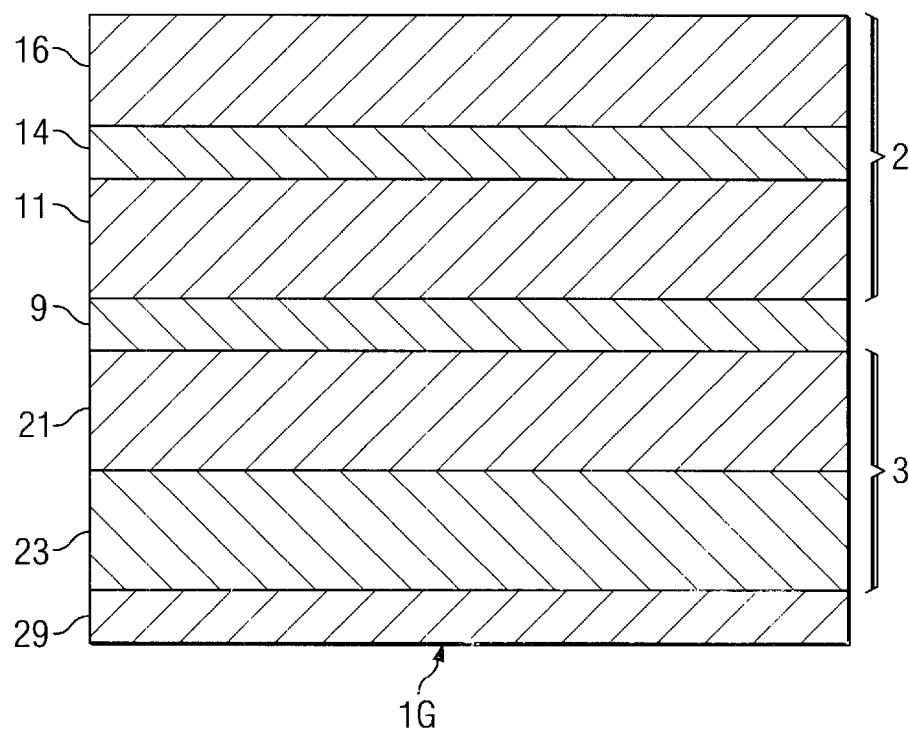
FIG. 24 is a sectional view of the information recording/displaying card of Embodiment 7.

The portion of the card where the visible information display part 2 is formed on the front surface has a sectional structure as shown in FIG. 24. The display part 2 including a light absorbing layer 14 and a display layer 16 formed on the substrate 11 is adhered onto the recording part 3 including the write-once magneto-optical recording layer 23 formed on the substrate 21 and covered with a protecting layer 29, with a urethane adhesive layer 9 sandwiched therebetween.

Figure 23:
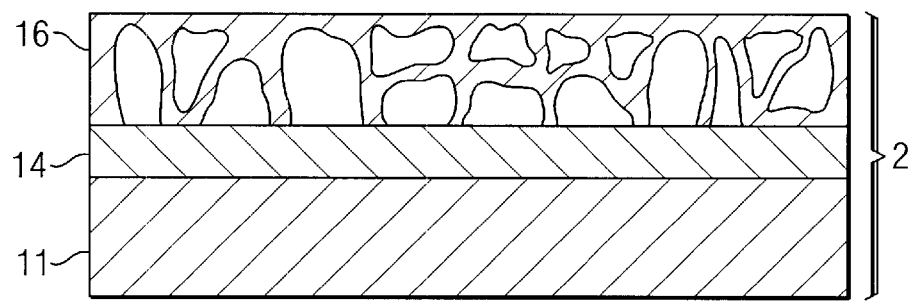
FIG. 23 is a sectional view of a display part of the information recording/displaying card of Embodiment 7.

In Embodiment 7, a polymer complex film is used as the display layer 16 as is shown in FIG. 23, and hence, the Chemical Formula (B2)

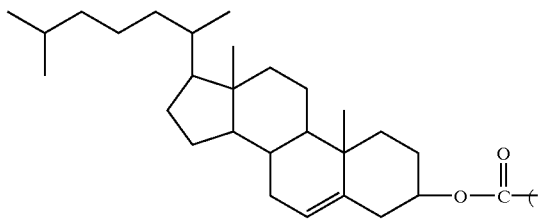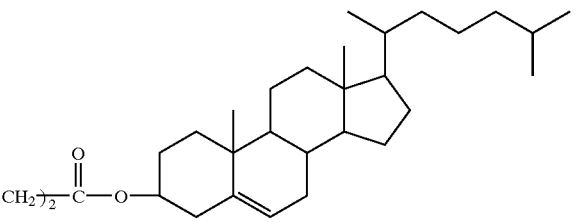

The compound of Chemical Formula (B2) has an isotropic phase transition temperature of approximately 170° C. and a melting point of 150° C.

The protecting layer 15 is made from a polyester film with a thickness of 2 μm, which is stacked on and adhered onto the display layer by heating at 120° C. Then, a urethane adhesive is applied on the back surface of the white PET sheet to be adhered with the IC substrate 36.

In Embodiment 6, when the display layer 12 is heated and rapidly cooled, a heated portion exhibits a reflecting color in accordance with the temperature from which it is cooled, and the reflecting state is solidified by rapidly cooling it from the temperature. Also, after the display layer 12 is heated to approximately 120° C. or more, when it is rapidly cooled, it becomes transparent, and when it is gradually cooled, it becomes opaque. In either case, a displayed image is erased. Embodiment 7 (see FIGS. 22, 23 and 24)

An information recording/displaying card 1G according to Embodiment 7 of the invention comprises, as is shown in FIGS. 22(A) and 22(B), a visible information display part 2, an embossed letter part 8 and a hologram display part 6 on the front surface of the card 1G, and an invisible information recording part 3 and a space part 5 for writing implements on the back surface thereof. In the embossed letter part 8, embossed letters are formed, and a user can sign his/her name in the space part 5. Therefore, double checking by referring to the visible information can prevent forgery and alternation of the card.

display layer 16 has large mechanical strength and can be suppressed from being damaged by an external force such as bend and friction without providing a protecting layer. Also, when the display layer 16 is heated to a temperature at which a low molecular weight cholesteric liquid crystal compound becomes the isotropic phase, the display layer 16 scarcely degrades.

The material and formation method for the visible information display part 2 will now be specifically described.

A white PES (polyether sulfone) sheet is coated with an isopropyl alcohol solution including carbon black dispersed in a silicon resin (manufactured by Toshiba Silicon Co.; YR3370) and a catalyst (manufactured by Toshiba Silicon Co.; CR15) into a thickness of 5 μm. The thus obtained coat film is cured, thereby forming the light absorbing layer.

A liquid crystal composition is prepared by mixing a mixture including the cholesteric liquid crystal compound represented by Chemical Formula (A1) and a cholesteric liquid crystal compound represented by Chemical Formula (D1) below at a weight ratio of 1:1 with bifunctional acrylate R712 having an aromatic ring (manufactured by Nippon Kayaku Co.) including 3 wt % of a photopolymerization initiator DAROCUR 1173 (manufactured by Ciba-Geigy) at a weight ratio of 6:4. This liquid crystal composition is applied on the light absorbing layer 14.

Chemical Formula (D1)

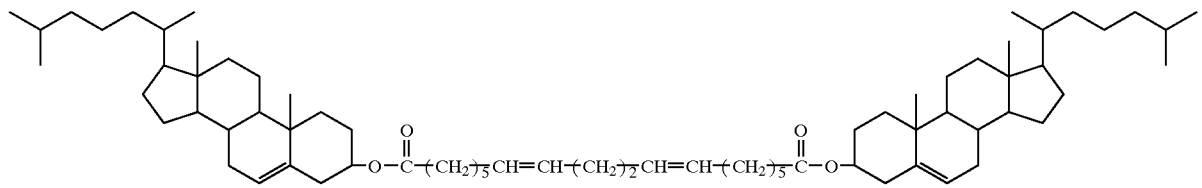

In Embodiment 7, card-shaped white PET (polyethylene terephthalate) substrates 11 and 21 are used. The invisible information recording part 3 includes a write-once magneto-optical recording layer.

The compound of Chemical Formula (D1) has an isotropic phase transition temperature of approximately 132° C. and a melting point of approximately 102° C. Also, the compound of Chemical formula (D1) can be obtained by, for example, reacting cholesterol with halide dicarboxylate or a derivative of dicarboxylic acid in the presence of an appropriate catalyst.

Then, the resultant sheet is irradiated with UV of 13 mW/cm$^2$ for 10 minutes, thereby forming the complex film (i.e., the reversible thermal display layer 16) with a thickness of 15 μm.

In Embodiment 7, when the display layer 16 is heated and rapidly cooled, a heated portion exhibits a reflecting color in accordance with the temperature from which it is cooled, and the light absorbing layer absorbs visible light. Therefore, the heated portion is observed in the reflecting color with black for a background. Furthermore, the reflecting state is solidified when the display layer 16 is rapidly cooled from the corresponding temperature. Moreover, after heating the display layer 16 to approximately 120° C. or more, when it is rapidly cooled, it becomes transparent, and when it is gradually cooled, it becomes opaque. In either case, a displayed image is erased.

Other Embodiments

The information recording/displaying card of the invention is not limited to those described in the aforementioned embodiments, and can be modified within the range of the scope of the invention.

In particular, as the low molecular weight cholesteric liquid crystal compound included in the display layer, various compounds that can exhibit the cholesteric phase and is solid at room temperature can be used apart from those represented by Chemical Formulas (A), (B), (C), (D), (E) and (F).

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An information recording/displaying card comprising:
a visible information display part adapted to display an image, said visible information display part including a cholesteric liquid crystal compound having an isotropic phase transition temperature higher than a melting point and which selectively exhibits a solid phase and a thermosensible cholesteric liquid crystal phase depending on a temperature thereof, wherein the displayed image is formed by applying a temperature change to said cholesteric liquid crystal compound; and wherein said cholesteric liquid crystal compound changes from the thermosensible cholesteric liquid crystal phase to the solid phase while keeping a state set in the thermosensible cholesteric liquid crystal phase by rapidly changing the temperature thereof; and
an invisible information recording part.

2. An information recording/displaying card according to claim 1,
wherein said invisible information recording part includes a magnetic recording layer.

3. An information recording/displaying card according to claim 1,
wherein said invisible information recording part includes a write-once optical recording layer.

4. An information recording/displaying card according to claim 1,
wherein said invisible information recording part includes an integrated circuit memory.

5. An information recording/displaying card according to claim 1,
wherein said visible information display part is disposed on a first surface of said card, and said invisible information recording part is disposed on a second surface of said card.

6. An information recording/displaying card according to claim 1,
wherein a surface of said card includes a portion where said visible information display part is disposed and a portion where said invisible information recording part is disposed.

7. An information recording/displaying card according to claim 1,
wherein said invisible information recording part is stacked on an irreversible visible information display part different from said visible information display part.

8. An information recording/displaying card according to claim 1, further comprising a space part where information is written with writing implements.

9. An information recording/displaying card according to claim 1, further comprising an information display part capable of irreversibly recording peculiar information.

10. An information recording/displaying card according to claim 1, further comprising a hologram layer or a diffraction grating layer.

11. An information recording/displaying card according to claim 1,
wherein said visible information display part includes plural kinds of low molecular weight cholesteric liquid crystals.

12. An information recording/displaying card according to claim 1,
wherein said temperature change used to form the image includes heating at least a first portion of said cholesteric liquid crystal compound to a first predetermined temperature at which light within a specific wavelength is reflected; and
wherein rapidly changing the temperature of said cholesteric liquid crystal compound includes rapidly cooling said at least a first portion of said cholesteric liquid crystal compound to a second temperature lower than the first predetermined temperature such that at least a portion of the image is formed by that specific wavelength of light.

13. An information recording/displaying card according to claim 12,
wherein said temperature change used to form the image includes heating said at least a first portion of said cholesteric liquid crystal compound to a temperature exceeding said isotropic phase transition temperature and then cooling said heated first portion prior to heating said at least a first portion of said cholesteric liquid crystal compound to a temperature at which light within a specific wavelength is reflected and then rapidly cooling said at least a first portion such that a portion of the image is formed by that specific wavelength of light.

14. An information recording/displaying card according to claim 12,
wherein a second predetermined temperature is a temperature at which light within a second specific wavelength is reflected,
wherein said temperature change includes heating at least a second portion of said cholesteric liquid crystal compound to said second predetermined temperature whereby said second portion is changed from a first phase to a second phase, and wherein rapidly changing the temperature of said cholesteric liquid crystal compound includes rapidly cooling said at least a second portion of said cholesteric liquid crystal compound to a temperature lower than the second predetermined temperature such that said second portion maintains said second phase.

15. An information recording/displaying card according to claim 1, wherein said cholesteric liquid crystal compound is formed from a plurality of cholesteric liquid crystal materials, and wherein at least one of the cholesteric liquid crystal materials is a low molecular weight cholesteric liquid crystal material having a molecular weight substantially in the range of 1000 to 1500 grams/mole.

16. An information recording/displaying system for an information recording/displaying card provided with a rewritable visible information display part including a cholesteric liquid crystal compound having an isotropic phase transition temperature higher than a melting point and which selectively exhibits a solid phase and a thermosensible cholesteric liquid crystal phase depending on a temperature thereof, wherein information is displayed in the rewritable visible information display part by applying a temperature change to the cholesteric liquid crystal compound, and an invisible information recording part, said information recording/displaying system comprising:

recording/erasing means for recording/erasing information in said visible information display part, wherein said recording/erasing means is adapted to apply a temperature change to record/erase information; and wherein at least a first portion of said cholesteric liquid crystal compound changes from the thermosensible cholesteric liquid crystal phase to the solid phase while keeping a state set in the thermosensible cholesteric liquid crystal phase by rapidly changing the temperature thereof; and recording means for recording information in said invisible information recording part.

17. An information recording/displaying system according to claim 16, wherein said recording/erasing means is a thermal head for writing information in said visible information display part.

18. An information recording/displaying system according to claim 16, wherein said recording/erasing means is a laser for writing information in said visible information display part.

19. An information recording/displaying system according to claim 16, further comprising reading means for reading information recorded in said invisible information recording part.

20. An information recording/displaying system according to claim 16, further comprising erasing means for erasing information recorded in said invisible information recording part.

* * * * *

UNITED STATES PATENT AND TRADEMARK OFFICE
CERTIFICATE OF CORRECTION

PATENT NO. : 6,580,481 B2
DATED : June 17, 2003
INVENTOR(S) : Hideaki Ueda et al.

It is certified that error appears in the above-identified patent and that said Letters Patent is hereby corrected as shown below:

Title page,
After "[30] Foreign Application Priroity Data, July 13, 1998 (JP) .....", delete "20-197156", and insert -- 10-197156 --.

Column 1,
Line 31, after "optical card.", delete "card.".

Column 9,
Line 23, delete "Through", and insert -- through --.

Column 11,
Line 56, delete "Through", and insert -- through --.

Column 14,
Line 20, delete "Sob", and insert -- 50b --.
Line 21, delete "S6 and S7", and insert -- 56 and 57 --.

Signed and Sealed this

Twentieth Day of April, 2004

JON W. DUDAS
*Acting Director of the United States Patent and Trademark Office*